US 8,391,378 B2

(12) United States Patent
Duvaut et al.

(10) Patent No.: US 8,391,378 B2
(45) Date of Patent: Mar. 5, 2013

(54) METRIC COMPUTATION FOR LOWERING COMPLEXITY OF MIMO DETECTION ALGORITHMS

(75) Inventors: Patrick Duvaut, Tinton Falls, NJ (US); Julien D Pons, Carteret, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 1176 days.

(21) Appl. No.: 12/251,862

(22) Filed: Oct. 15, 2008

(65) Prior Publication Data

US 2009/0232232 A1 Sep. 17, 2009

Related U.S. Application Data

(60) Provisional application No. 61/035,472, filed on Mar. 11, 2008.

(51) Int. Cl.
H04K 1/10 (2006.01)
H04L 27/28 (2006.01)

(52) U.S. Cl. .................................................. 375/260

(58) Field of Classification Search ............. 375/360, 375/367, 20
See application file for complete search history.

(56) References Cited

U.S. PATENT DOCUMENTS

| 2008/0144746 | A1* | 6/2008 | Waters et al. ............. 375/340 |
| 2008/0279299 | A1* | 11/2008 | Reuven et al. ............ 375/267 |
| 2009/0213954 | A1* | 8/2009 | Bursalioglu et al. ....... 375/262 |

OTHER PUBLICATIONS

K. Wong, C. Tsui R. Cheng, and W. Mow, "A VLSI architecture of a K-best lattice decoding algorithm for MIMO channels", in Proc IEEE Int. Symp. Circuits Systems, vol. 32, pp. 273-276, May 2002.

Z. Guo, and P. Nilsson, "Algorithm and implementation of the K-best sphere decoding for MIMO detection", IEEE journal on selected areas in commun., vol. 24, No. 3, pp. 491-502, Mar. 2006.

P. Radosavljevic, and J. Cavallaro, "Soft sphere detection with bounded search for high-throughput MIMO receivers", In Proc. 40th Asilomar Conf. on Signals, Syst. and Computers, pp. 1175-1179, Nov. 2006.

R. Shariat-Yazdi and T. Kwasniewski, "Reconfigurable K-best MIMO detector architecture and FPGA implementation", In Proc IEEE It. Symp. Intelligent Signal Process. and Commun. Syst., pp. 349-352, Nov. 2007.

E. Viterbo, and J. Boutros, "A universal lattice code decoder for fading channels", IEEE trans. in Information theory, vol. 45, No. 5, pp. 1639-1642, Jul. 1999.

E. Agrell, T. Eriksson, A. Vardy, and K. Zeger, "Closets point search in lattices", IEEE trans. in Information theory, vol. 48, No. 8, pp. 2201-2214, Aug. 2002.

B. Hassibi, "An efficient square-root algorithm for BLAST", Mathematics of communication research, Bell Labs Lucent technologies, Jan. 2000.

J. Pons, "MIMO detection—Part I: Classical techniques & performance comparison", Conexant white paper, Dec. 2007.

IEEE Std 802.16TM-2004, IEEE Standard for Local and Metropolitan Area Networks, "Part 16: Air Interface for Fixed Broadband Wireless Access Systems". Oct. 1, 2004.

*Primary Examiner* — David C. Payne
*Assistant Examiner* — Tanmay Shah
(74) *Attorney, Agent, or Firm* — Mark J. Danielson; Pillsbury Winthrop Shaw Pittman LLP

(57) ABSTRACT

Included are embodiments of method for method for computing metrics. At least one embodiment includes searching a MIMO detection tree, the detection tree configuration being formed by a plurality of nodes and a plurality of leaves connected via a plurality of branches, the computational complexity associated with computing a node metric decreases with the node depth in the tree configuration and providing an estimate on a transmitted signal.

20 Claims, 11 Drawing Sheets

METRIC COMPUTATION FOR LOWERING COMPLEXITY OF MIMO DETECTION ALGORITHMS

CROSS REFERENCE

This application claims the benefit of U.S. Provisional Application No. 61/035,472, filed Mar. 11, 2008, which is incorporated by reference in its entirety.

BACKGROUND

Multiple-Input Multiple Output (MIMO) technology is employed in today's wireless digital communication systems to improve spectral-efficiency and robustness to fading without increasing power or bandwidth. In many current wireless standards, MIMO may be combined with channel coding to further improve the system diversity. Besides, Quadrature Amplitude Modulation (QAM) may be utilized to further increase spectral-efficiency. One challenge in MIMO is the detection stage, which is performed at the receiver and can require an excessively large computational complexity in order to achieve the optimal MIMO gain. As of today, many detection techniques have been proposed to closely approach optimal performance with affordable complexity. Among them, K-best detection methods offer an excellent performance/complexity tradeoff.

K-best detection methods search in a breadth-first manner a MIMO detection tree configuration, wherein, the tree configuration is formed by a plurality of nodes arranged in levels, and connected via a plurality of branches. Basically, for each level in the tree configuration, the K-best detection algorithm only expands the paths emerging from the K nodes with the smallest metric.

Historically, the first K-best detector implementations have been based on the Fincke-Pohst (FP) and Schnorr-Euchner (SE) strategies originally used in sphere decoding. However, these strategies may not yield the best complexity-efficiency since they involve complex operations such as matrix inversion in the preprocessing stage. More recently, one observed that, although utilized in sphere decoding, matrix inversions may be unnecessary in K-best detection, Accordingly, many implementations may utilize K-best detection algorithms involving no such inversions. Moreover, given the lattice property of QAM constellations, the computational complexity utilized to detect each signal can be further reduced by replacing some multiplications with shift/add operations.

Despite the momentum to reduce K-best detection complexity, all K-best detection techniques proposed so far can be identified to a K-best tree search, where the complexity associated with visiting a node in the tree configuration grows with the node depth (i.e., level) in the tree.

SUMMARY

Included are embodiments of method for method for computing metrics. At least one embodiment includes searching a MIMO detection tree, the detection tree configuration being formed by a plurality of nodes and a plurality of leaves connected via a plurality of branches, the computational complexity associated with computing a node metric decreases with the node depth in the tree configuration and providing an estimate on a transmitted signal.

Also included is an embodiment of system for computing metrics, comprising: a searching component configured to search a MIMO detection tree, the detection tree configuration being formed by a plurality of nodes and a plurality of leaves connected via a plurality of branches, the computational complexity associated with computing a node metric decreases with the node depth in the tree configuration; and a providing component configured to provide an estimate on a transmitted signal.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

Figure 6A:
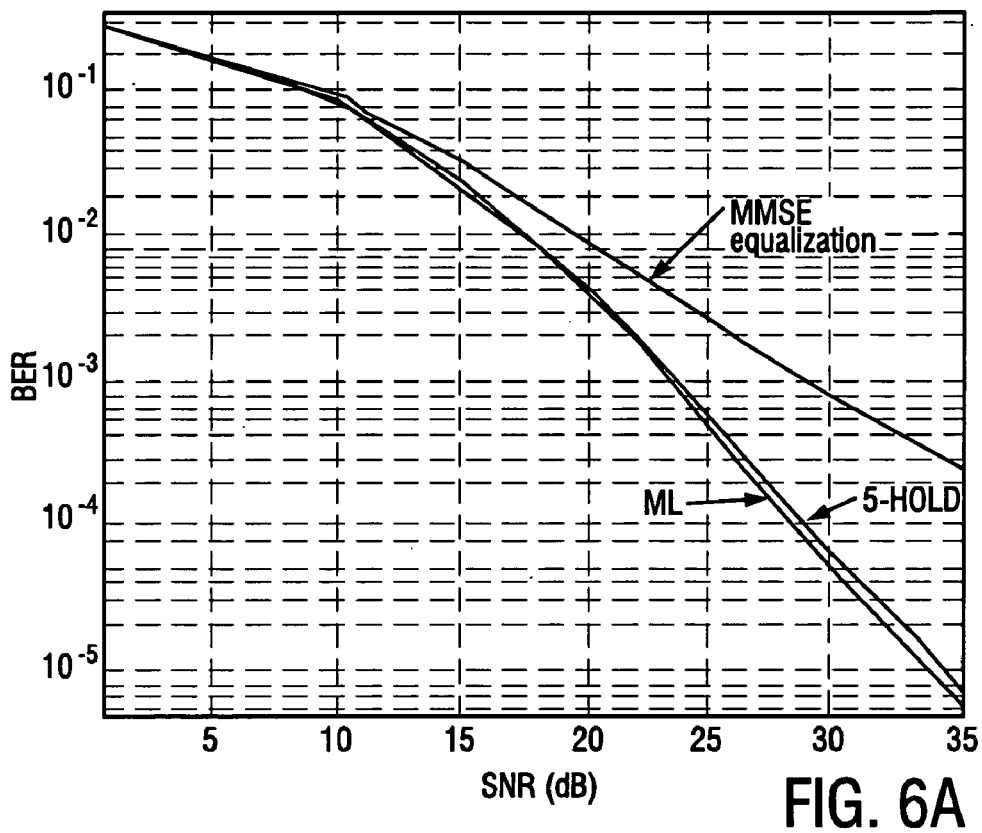
FIG. 6A depicts an exemplary graphical representation of K-HOLD detection performance for unitary average energy uncoded 16-QAM transmission over a 2×2 uncorrelated Rayleigh fading (URF) channel with background AWGN.
Figure 6B:
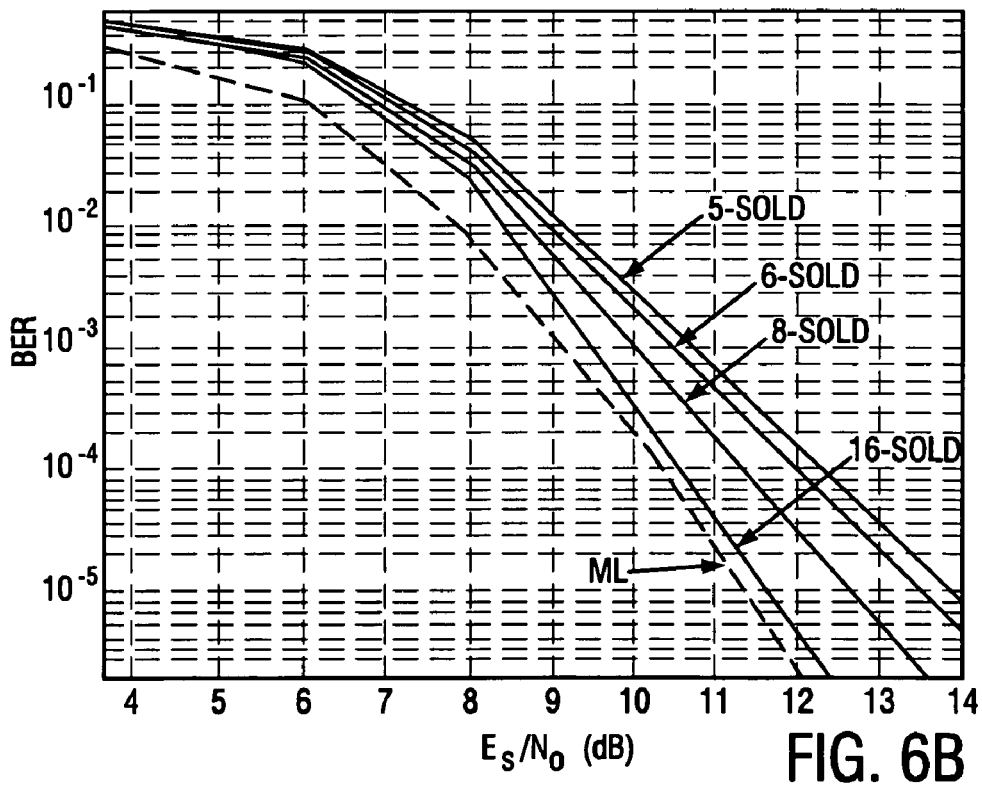

FIG. 6B illustrates an exemplary embodiment of K-SOLD performance as a function of K for 64-state convolutional coded 16-QAM transmission over 2×2 URF channel with background AWGN.

Figure 6C:
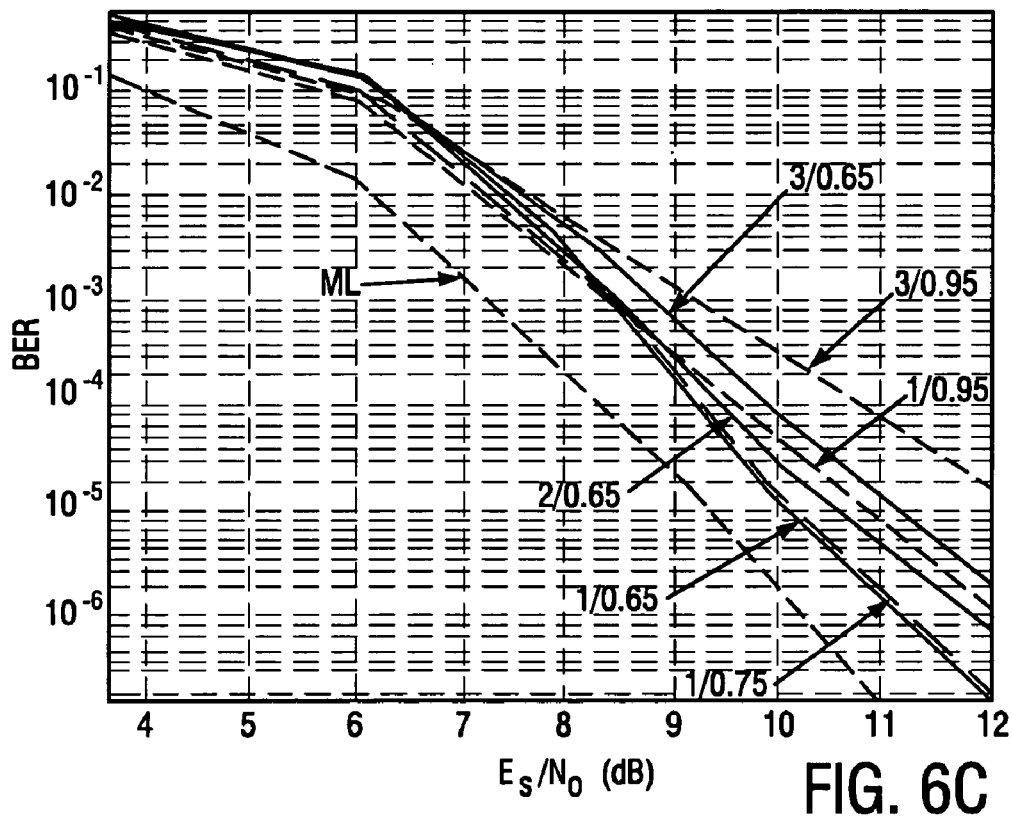

FIG. 6C illustrates an exemplary embodiment of K-SOLD performance, which may be represented as a function of N' and R for 64-state convolutional coded 16-QAM transmission over 4×4 URF channel with background AWGN.

Figure 6D:
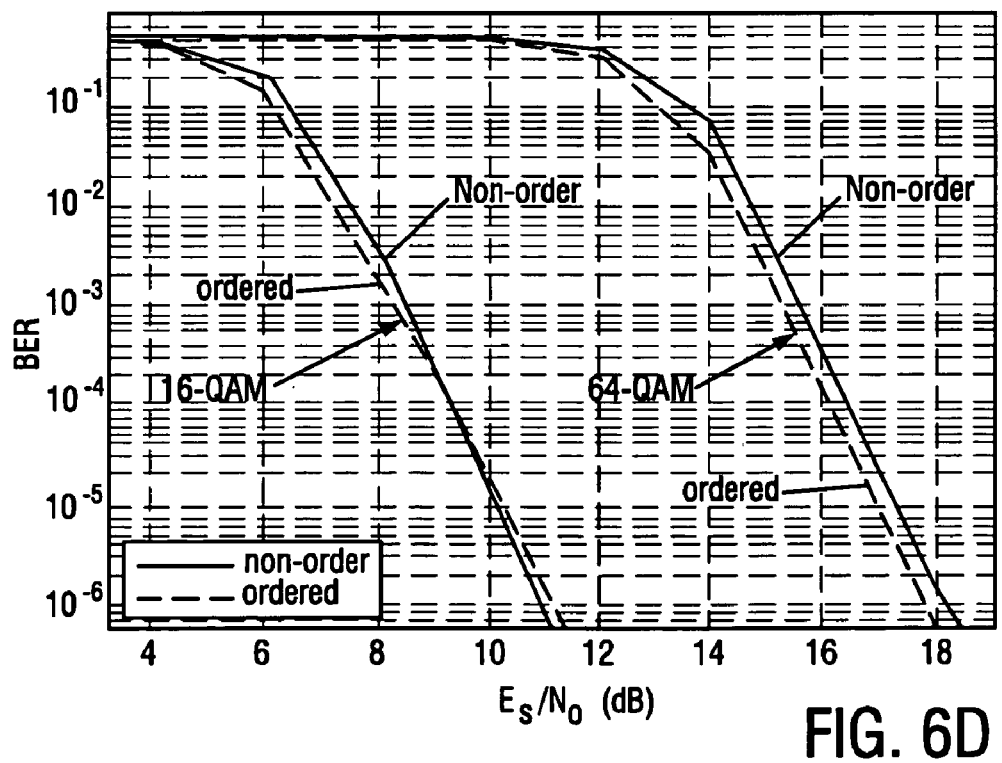

FIG. 6D illustrates an effect of matrix reordering on K-SOLD performance for 64-state convolutional coded 16 and 64-QAM transmission over 4×4 URF channel with background AWGN.

DETAILED DESCRIPTION

Embodiments disclosed herein include methods for computing metrics in K-best MIMO detection such that the complexity associated with visiting a node in the tree configuration decreases with the node depth in the tree. Since the number of visited nodes increases with the depth, these embodiments better balance node complexity and the number of visited nodes at a given depth, thereby reducing complexity over existing (previously proposed) algorithms. Some embodiments include hard-output detection, while some embodiments include a complexity-efficient extension to soft-output MIMO detection in order to use MIMO jointly with soft-input channel decoding.

Figure 1:
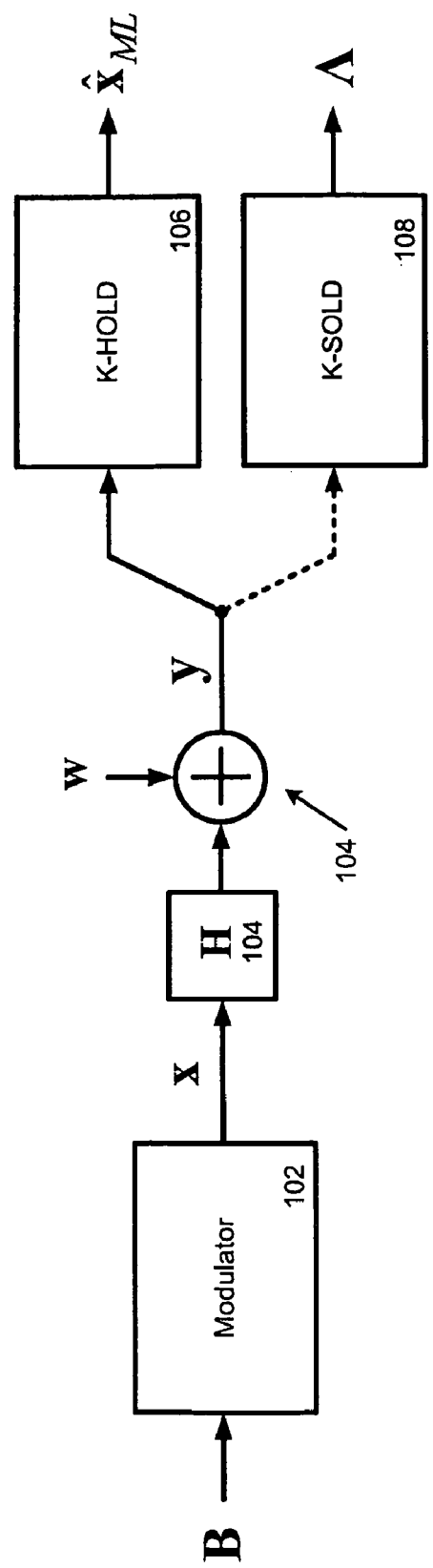
FIG. 1 illustrates an exemplary embodiment of a system for utilizing a K-best hard output lattice decoder (K-HOLD) algorithm and/or a K-best soft output lattice decoder (K-SOLD) algorithm.

At least one embodiment included herein assumes a perfectly synchronized MIMO system with an identical number of transmit and receive antennas, as depicted in FIG. 1. More specifically, FIG. 1 illustrates an exemplary embodiment of a system for utilizing a K-best hard output lattice decoder (K-HOLD) algorithm and/or a K-best soft output lattice decoder (K-SOLD) algorithm. As illustrated in the nonlimiting example of FIG. 1, the system may include a modulator 102, which may receive a signal B. B=[$b_{m,n}$] is a M×N matrix representing the coded bits mapped to the MIMO signal x. B may be modulated and the result MIMO signal x may be transmitted over a channel represented by the transfer matrix H and with an additive noise w. The transmission of x over the channel can be modeled as the product Hx combined (via summer 104) with an N-dimensional additive noise vector w. The channel output signal y=Hx+w may then be applied to the desired algorithm 106, 108.

More specifically, an information bit stream B may be demultiplexed into N substreams, each labeled by an index n ∈ {1, . . . , N}, where N may be used to signify an MIMO signal dimension. At each instant in time, M bits ($b_{1,n}$, . . . , $b_{m,n}$, . . . , $b_{M,n}$) of the $n^{th}$ substream (where M may be used to indicate a number of bits mapped per dimension) may be modulated by the modulator 102 to a signal $x_n$ taken from an amplitude shift keying (ASK) signal set Ω, where Ω may be used to represent a set of $2^M$ elementary one-dimensional coordinates forming a MIMO signal. Each ASK signal $x_n$ may then transmitted over an antenna and/or can be concatenated in quadrature with another ASK signal $x_{n'}$ to form a QAM signal $x_n+j·x_{n'}$ transmitted over an antenna. One should note that x=[$x_1$ . . . $x_N$]$^T$ may be the N-dimensional signal transmitted over all antennas at each time instant. On the receiver side, at each instant, the detector inputs the baseband signal may be represented as:

$$y = Hx + w \quad (1)$$

where H 104 represents an N×N transfer matrix of a channel (in at least one embodiment, H is real), and W is an N-dimensional additive noise vector. Each element of W may include an additive white Gaussian noise (AWGN) sample of power spectral density $N_0$. The receiver can switch to hard-output lattice decoder (K-HOLD) decoder 106 or and/or a soft-output lattice decoder (K-SOLD) decoder 108. Each dimension n maps the column vector $b_n$ (formed by M bits $b_{1,n}$ . . . $b_{M,n}$) to a $2^M$-ary one-dimensional symbol $x_n$. The mapping operation is characterized by the one-to-one correspondence:

$$x_n = \mu(b_n). \quad (2)$$

The inverse operation is called demapping and may be characterized by the function:

$$b_n = \mu^{-1}(x_n). \quad (3)$$

As a member of the family of near-optimal MIMO detection techniques, K-best lattice decoding generally aims to approach a most likely (ML) transmitted signal:

$$\hat{x}_{ML} = \underset{x \in \Omega^N}{\mathrm{argmin}} \|y - Hx\|^2. \quad (4)$$

By limiting the minimization problem (4) to searching candidates x located in a non-exhaustive set $\chi \subset \Omega^N$. The construction of $\chi$ may be performed recursively and can be better understood in terms of a tree search. In one exemplary embodiment, the minimization problem (4) may be rewritten as:

$$\hat{x}_{ML} = \underset{x \in \chi}{\mathrm{argmin}} \|\check{y} - Rx\|^2, \quad (5)$$

where $\check{y} = Q^T y$, and Q and R are a rotation and upper-triangular matrix resulting from a QR decomposition of the channel matrix H, respectively. R may be obtained by a unitary rotation of H, and hence minimizing $\|\check{y}-Rx\|^2$ may be equivalent to minimizing $\|y-Hx\|^2$. Nonetheless, because of the upper-triangular property of R, the calculation of Rx may involve less of a computational burden. Generally, for each candidate point $\hat{x}$, the computation of $\|\check{y}-R\hat{x}\|^2$ can be rewritten as $$\|\check{y} - R\hat{x}\|^2 = \sum_{n=1}^{N} \left( \check{y}_n - \sum_{k=n}^{N} r_{n,k} \cdot \hat{x}_k \right)^2, \quad (6)$$

where the $r_{i,j}$'s denote the row-column entries of R.

Figure 2:
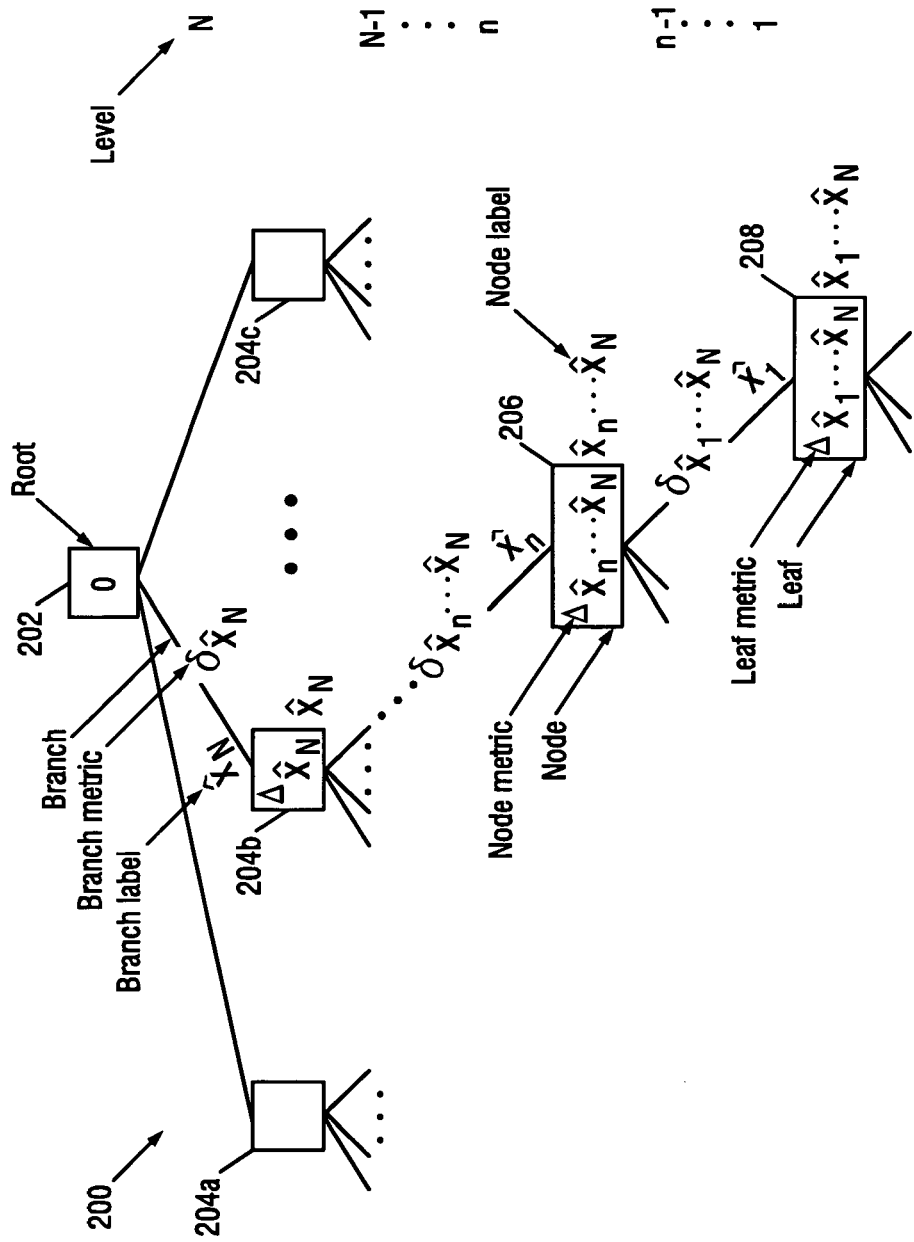
FIG. 2 illustrates an exemplary embodiment of a tree diagram.

FIG. 2 illustrates an exemplary embodiment of a tree diagram 200, representing an embodiment of equation (6). More specifically, the tree diagram 200 may be formed by nodes 202-208, which may be organized in levels and connected via branches. At level-n, each node (e.g., node 206) represents a particular state [$\hat{x}_n$ . . . $\hat{x}_N$] of the channel input vector [$x_n$ . . . $x_N$]$^T$, and is labeled as $\hat{x}_n$ . . . $\hat{x}_N$. Each level-n node $\hat{x}_n$ . . . $\hat{x}_N$ may be connected to a level-(n+1) node $\hat{x}_{n+1}$ . . . $\hat{x}_N$ (i.e., node 204b) via a branch representing a particular state $\hat{x}_n$ of the signal $x_n$ and weighted with the metric $$\delta_{\hat{x}_n \ldots \hat{x}_N} = \left( \check{y}_n - \sum_{k=n}^{N} r_{n,k} \cdot \hat{x}_k \right)^2. \quad (7)$$

Besides, each node $\hat{x}_n$ . . . $\hat{x}_N$ may be associated with a weight $\Delta_{\hat{x}_n \ldots \hat{x}_N}$ obtained by adding the metrics of the branches forming the depth-(N−n+1) path connecting the node to the root, i.e., the level-(N+1) origin node. As a nonlimiting example, the weight of node 204b may be $\Delta_{\hat{x}_N}$, which may represent the sum of the metrics of the branches to that node 204b (i.e., $\hat{x}_N$, which is the metric of the branch between node 202 and 204b). Similarly, the weight of node 206 may include the metrics from branches between node 202 and node 204b, as well as the metrics of the branch between node 204b and node 206. Thus, a relationship between node and branch metrics is then given by:

$$\Delta_{\hat{x}_n \ldots \hat{x}_N} = \Delta_{\hat{x}_{n+1} \ldots \hat{x}_N} + \delta_{\hat{x}_n \ldots \hat{x}_N} = \sum_{k=n}^{N} \delta_{\hat{x}_k \ldots \hat{x}_N}. \quad (8)$$

Therefore, $\|\breve{y}-R\hat{x}\|^2$ can be interpreted as the weight $\Delta_{\hat{x}_1 \ldots \hat{x}_N}$ of the depth-N path drawn by the candidate $\hat{x}$. This path connects the root to the leaf (i.e., level-1 node) $\hat{x}_1 \ldots \hat{x}_N$.

In K-best lattice decoding, the subset $\chi \subset \Omega^N$ of searched candidates is constructed recursively. More specifically, at each level in the tree search, only the K nodes yielding the smallest node metric (i.e., which are those most likely to lead to the ML leaf $\hat{x}_{ML}$) are selected for being extended to lower levels, other nodes are pruned (i.e., not further extended). Thus, although an exhaustive search could involve visiting $2^{M(N-n-1)}$ nodes at level-n, a K-best search may involve visiting at most $2^M \cdot K$ nodes per level, thereby reducing the exhaustive search's exponentially growing complexity (as a function of n) to a linearly growing complexity. Pruning some nodes can lead to suboptimality. Yet, optimal performance can be closely approached for an appropriate choice of K.

Figure 3:
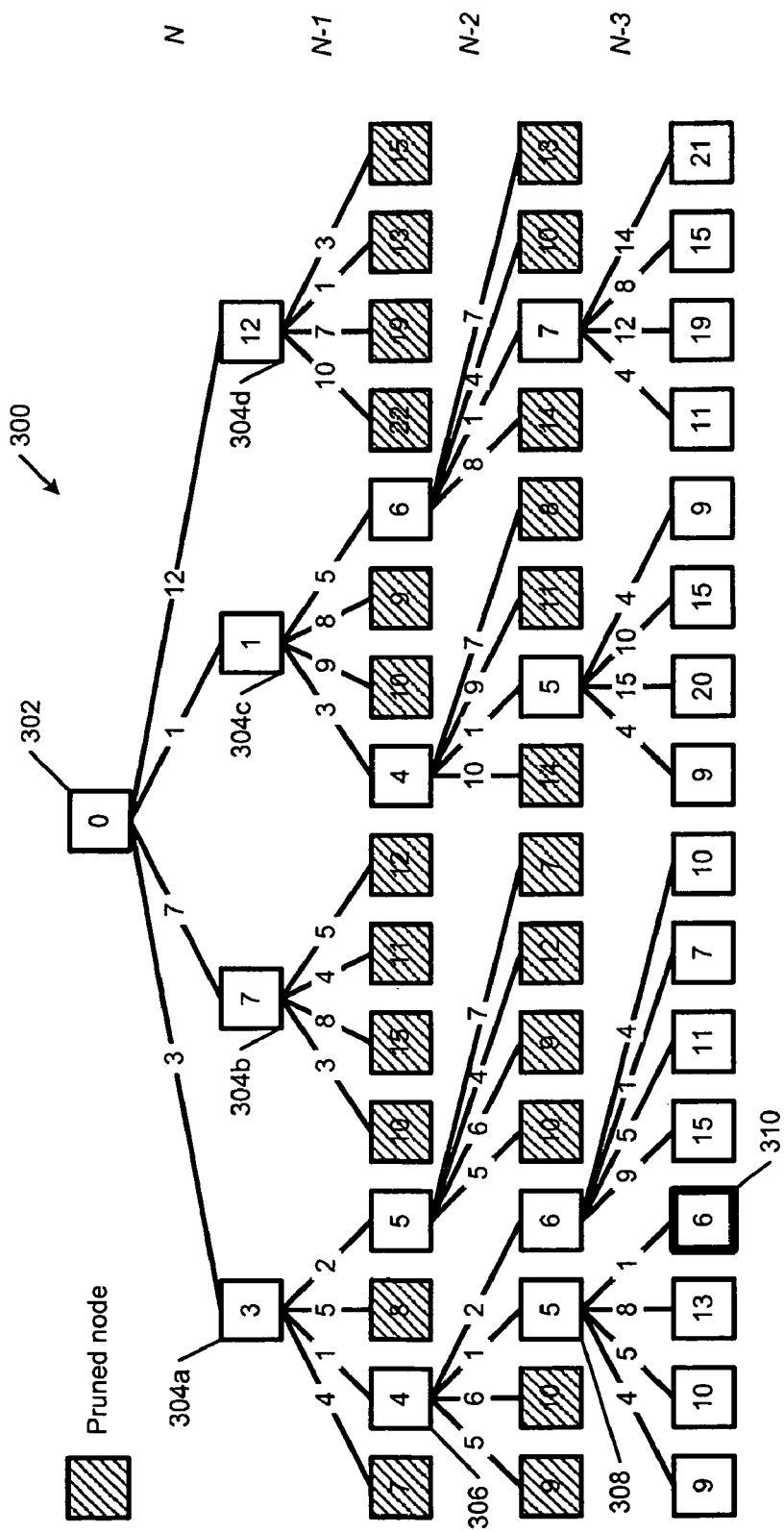
FIG. 3 illustrates an exemplary embodiment of a 4-best visit of a tree representing a MIMO system with, M=2, K=4, $\Omega=\{-3,-1,+1,+3\}$ and N=4, similar to the tree diagram from FIG. 2.

FIG. 3 illustrates an exemplary embodiment of a 4-best visit of a tree representing a MIMO system with, M=2, K=4, $\Omega=\{-3,-1,+1,+3\}$ and N=4, similar to the tree diagram from FIG. 2. As seen in equation (8) above, the computation of a level-n node metric $\Delta_{\hat{x}_n \ldots \hat{x}_N}$ may involve updating a level-(n+1) node metric $\Delta_{\hat{x}_{n-1} \ldots \hat{x}_N}$ with the metric $\delta_{\hat{x}_n \ldots \hat{x}_N}$ of the branch connecting both nodes. Similarly, as seen in equation (7), the complexity for computing $\delta_{\hat{x}_n \ldots \hat{x}_N}$ may increase as the level order diminishes. Conversely, a K-best search may involve visiting an increasing number of nodes per level (up to saturate to at most $2^M \cdot K$ visited nodes per level) as the level order decreases.

Embodiments disclosed herein include techniques for updating the node metric, such that the complexity for computing $\delta_{\hat{x}_n \ldots \hat{x}_N}$ decreases as the level order diminishes, thereby better balancing complexity for updating a node and number of visited nodes per level.

As illustrated, the tree 300 can include a plurality of nodes 302-310, organized with levels N to N−3. As discussed above, at least one exemplary embodiment may be configured such that the weight of a given node may equal a sum of the metrics of the branches to reach that node from the root node 302. Consequently, embodiments disclosed herein can utilize a breadth first search based algorithm. More specifically, the weight of node 304a may have a value of 3 due to the fact that the metric of the branch between 304a and 302 has a value of 3. The same can be said for nodes 304b, 304c, and 304d. Similarly, the node 306 may have a weight of 4, which is determined from the sum of the metric of the branch between node 302 and node 304a (value of 3), and the metric of the branch between the node 304a and the node 306 (1). Depending on the determined value of K (in this nonlimiting example, K=4), a determination may be made of the K best results at each level. Accordingly, at each level of FIG. 3, the four best nodes are chosen. When there are four or less nodes in a level, all nodes will be chosen. Thus, at the third level, the weights of the nodes are compared and the four lowest weighted nodes are chosen (the rest are pruned). Similarly, from the branches of the chosen nodes from the third level, the four "lightest" nodes in the fourth level are chosen, based on their determined weights. This process can continue until the last level is reached, at which point a best node is chosen.

In the following, one mathematically details a method is for computing node and branch metrics such that the complexity associated with visiting a node in the tree configuration decreases with the node depth in the tree.

Given the upper-triangular property of R, one can develop the vector $\breve{y}-R\hat{x}$ as:

$$\breve{y} - R\hat{x} = \begin{bmatrix} \breve{y}_1 - r_{1,N} \cdot \hat{x}_N \\ \vdots \\ \breve{y}_{N-1} - r_{N-1,N} \cdot \hat{x}_N \\ 0 \end{bmatrix} + \begin{bmatrix} 0 \\ \vdots \\ 0 \\ \breve{y}_N - r_{N,N} \cdot \hat{x}_N \end{bmatrix} - \begin{bmatrix} \lfloor R \rfloor_{N-1} \\ 0 \ldots 0 \end{bmatrix} \cdot \lfloor \hat{x} \rfloor_{N-1}, \quad (9)$$

where the operation $\lfloor \hat{x} \rfloor_{N-1}$ denotes the truncation of the vector $\hat{x}$ to its N−1 first coordinates, $\lfloor R \rfloor_{N-1}$ is a (N−1)×(N−1) submatrix of R obtained via the decomposition:

$$R = \begin{bmatrix} \lfloor R \rfloor_{N-1} & \lfloor r_N \rfloor_{N-1} \\ 0 \ldots 0 & r_{N,N} \end{bmatrix} \quad (10)$$

and $r_N$ denotes the $N^{th}$ column vector of R. More generally, one should note $\lfloor R \rfloor_n$ the matrix R may be restricted to its first n rows and n columns. Thus, $\lfloor R \rfloor_n$ is upper-triangular.

Given equation (9), the square distance $\|\breve{y}-R\hat{x}\|^2$ can be rewritten as:

$$\|\breve{y}-R\hat{x}\|^2 = \|\breve{y}_{\hat{x}_N} - \lfloor R \rfloor_{N-1} \cdot \lfloor \hat{x} \rfloor_{N-1}\|^2 + \delta_{\hat{x}_N} \quad (11), \text{where}$$

$$\breve{y}_{\hat{x}_N} = \lfloor \breve{y} \rfloor_{N-1} - \lfloor r_N \rfloor_{N-1} \cdot \hat{x}_N \quad (12) \text{ and}$$

$$\delta_{\hat{x}_N} = (\breve{y}_N - r_{N,N} \cdot \hat{x}_N)^2. \quad (13)$$

As illustrated in equation (11), the metric $\|\breve{y}-R\hat{x}\|^2$ can be computed in a recursive manner by calculating a branch metric $\delta_{\hat{x}_N}$, then by reducing the N-dimensional distance computation problem to the (N−1)-dimensional problem $\|\breve{y}_{\hat{x}_N} - \lfloor R \rfloor_{N-1} \cdot \lfloor \hat{x} \rfloor_{N-1}\|^2$. Then, by computing $$\delta_{\hat{x}_{N-1},\hat{x}_N} = ([\breve{y}_{\hat{x}_N}]_{N-1} r_{N-1,N-1} \cdot \hat{x}_{N-1})^2 \quad (14),$$

where $[\breve{y}_{\hat{x}_N}]_{N-1}$ denotes the (N−1)$^{th}$ component of $\breve{y}_{\hat{x}_N}$, the latter (N−1)-dimensional distance computation problem can be reduced to a (N−2)-dimensional problem, and so on, to reach n=1. In a more general way, for n<N, the metric $\|\breve{y}-R\hat{x}\|^2$ can be expressed as:

$$\|\breve{y} - R\hat{x}\|^2 = \|\breve{y}_{\hat{x}_{n+1} \ldots \hat{x}_N} - \lfloor R \rfloor_n \cdot \lfloor \hat{x} \rfloor_n\|^2 + \sum_{k=n+1}^{N} \delta_{\hat{x}_k \ldots \hat{x}_N}, \quad (15)$$

where $\breve{y}_{\hat{x}_n \ldots \hat{x}_N} = \lfloor \breve{y}_{\hat{x}_{n+1} \ldots \hat{x}_N} \rfloor_{n-1} - \lfloor r_n \rfloor_{n-1} \cdot \hat{x}_n \quad (16)$ and $\delta_{\hat{x}_n \ldots \hat{x}_N} = ([\breve{y}_{\hat{x}_{n+1} \ldots \hat{x}_N}]_n - r_{n,n} \cdot \hat{x}_n)^2. \quad (17)$ Such square distance computation is well suited to tree search algorithms, since the coordinates of the candidate $\hat{x}$ are sequentially involved in the recursive construction of the metric. More specifically, in order to reduce the problem dimension, each recursion may involve a knowledge of at least one extra coordinate of $\hat{x}$ relative to the previous recursion. Thus, each recursion can be interpreted as going one level deeper in the following tree where, at level-n, the node representing the path $[x_n \ldots x_N]^T$ is labeled with $x_n \ldots x_N$; the branch connecting the node $x_n \ldots x_N$ is weighted with the metric $\delta_{\hat{x}_n \ldots \hat{x}_N}$ expressed in equation (17); and the node metric $\Delta_{\hat{x}_n \ldots \hat{x}_N}$ can be updated based on equation (8).

In at least one exemplary embodiment, the branch metric computation involves knowledge of the $n^{th}$ coordinate of $\check{y}_{\hat{x}_{n+1} \ldots \hat{x}_N}$. As a consequence, each node may not only be associated with a label $x_n \ldots x_N$ and weight $\Delta_{\hat{x}_n \ldots \hat{x}_N}$, but also with a (n−1)-dimensional vector $\check{y}_{\hat{x}_n \ldots \hat{x}_N}$ updated based on equation (16) and propagated to the next level.

The complexity associated with each visited node can be approximated by the sum of the complexities for computing the branch metric from equation (17) and that for updating $\check{y}_{\hat{x}_n \ldots \hat{x}_N}$. According to equation (16), the latter complexity depends on the dimension of $\check{y}_{\hat{x}_n \ldots \hat{x}_N}$ (i.e., n−1), which decreases as the node approaches the leaf. Further, as indicated above, the term "K-HOLD," may be utilized to indicate a K-best hard-output lattice decoding algorithm based on the latter metric computation method. An embodiment of the K-HOLD algorithm can be stated a follows:

As typical lattice decoders, K-HOLD may utilize some preprocessing and predecoding before starting the actual decoding. Performed after each (re)estimation of H, the preprocessing stage may involve computing Q and R via a QR decomposition of the channel matrix estimate. One should note that inverting H or R may not be needed.

The predecoding stage involves basically calculating $\check{y}=Q^T y$ and initializing memory. Let's recall that predecoding is performed more often than preprocessing, (i.e., for each received signal y).

Figure 4A:
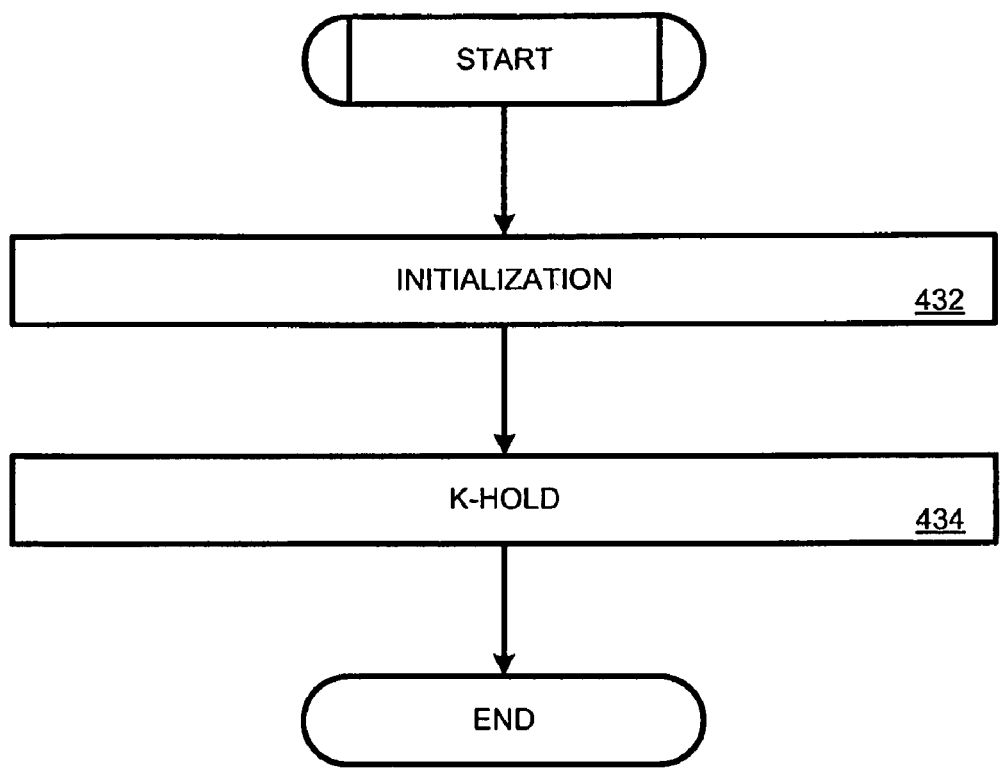
FIG. 4A illustrates an exemplary embodiment of a process that may be utilized to implement the K-HOLD algorithm.

The decoding stage inputs $\check{y}$ and outputs an estimate on $\hat{x}_{ML}$. The decoding stage may involve a tree search in a K-best manner, which is summarized in the flowchart depicted in FIGS. 4A-4C. More specifically, FIG. 4A illustrates an exemplary embodiment of a process that may be utilized to implement the K-HOLD algorithm. As illustrated, in executing at least one embodiment of the K-HOLD algorithm, an initialization algorithm may be executed (block 432). Additionally, the K-HOLD algorithm (434) may also be executed.

Figure 4B:
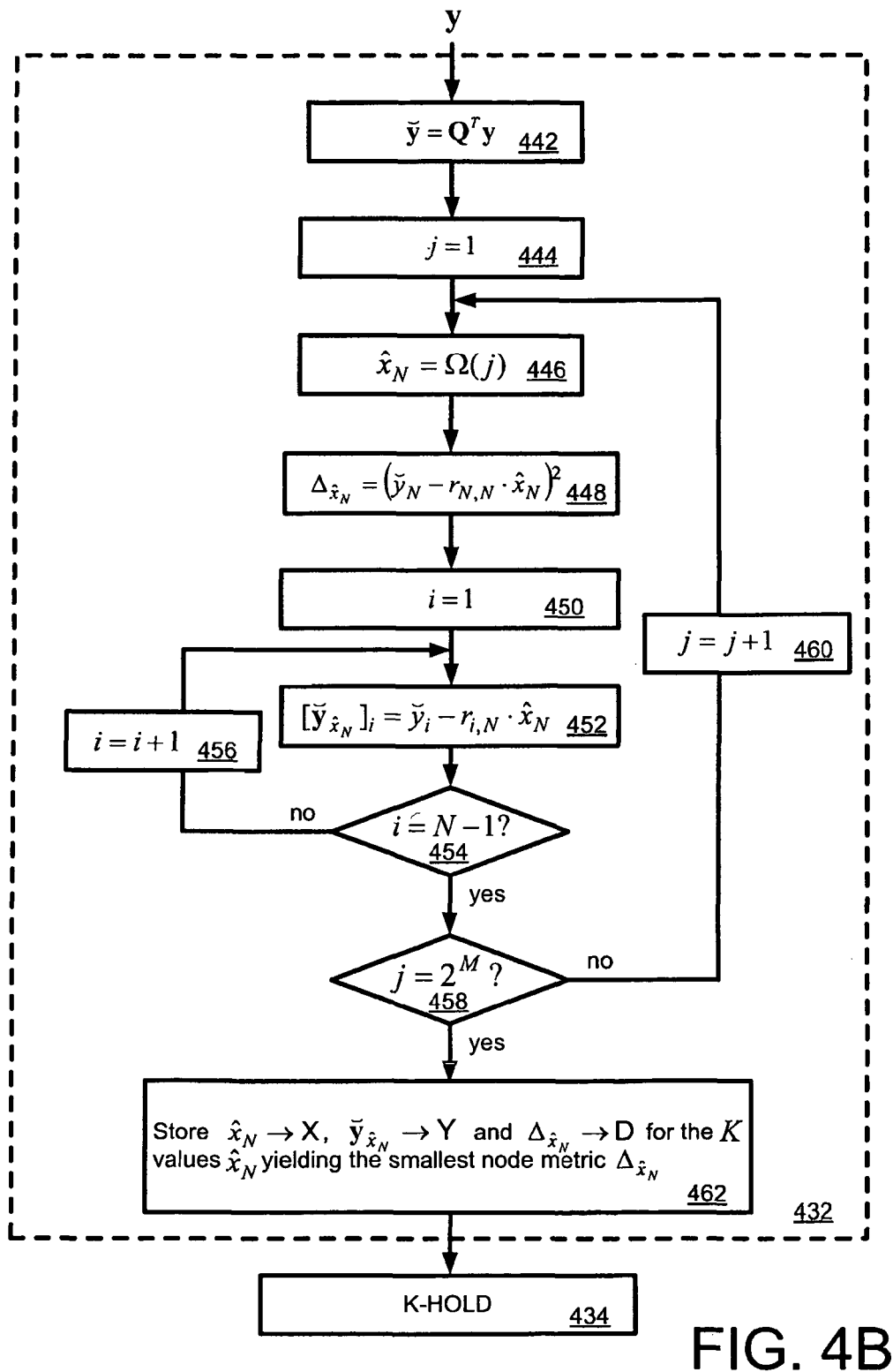
FIG. 4B illustrates an exemplary embodiment of an initialization algorithm, such as the initialization algorithm from FIG. 4A.

Similarly, FIG. 4B illustrates an exemplary embodiment of an initialization algorithm, such as the initialization algorithm 432, from FIG. 4A. More specifically, one should note that in the embodiments of FIGS. 4B and 4C, the variables X, Y, and D store the K-best values of $\hat{x}_{n+1} \ldots \hat{x}_N$, $\check{y}_{\hat{x}_{n+1} \ldots \hat{x}_N}$ and $\Delta_{\hat{x}_{n+1} \ldots \hat{x}_N}$, respectively. The memory size for X, Y, and D utilized at level-n equals (N-n+1)×K, (n−1)×K and 1×K, respectively. As illustrated, the variable y may be received at block 432 and multiplied with $Q^T$ to yield $\check{y}$ (block 442). Then, j is set to 1 (block 444). $\hat{x}_N$ may be set to the $j^{th}$ signal $\Omega(j)$ of the signal set $\Omega$ (block 446). Additionally, the weight of a node $\Delta_{\hat{x}_N}$ is determined from the square of $\check{y}_N$ subtracted from $r_{N,N} \cdot \hat{x}_N$ (block 448). The variable i may also be set to 1 (block 450). $[\check{y}_{\hat{x}_N}]_i$ is then determined for the variable i, from $\check{y}_i - r_{i,N} \cdot \hat{x}_N$ (block 452). A determination can then be made whether i is equal to N−1 (i.e., have all layers been addressed?) at block 454. If i is not equal to N−1, the process proceeds to block 456 to increment i by 1 and returns to block 452. If, on the other hand, i is equal to N−1, a determination is made whether j is equal to $2^M$ (block 458). If j is not equal to $2^M$, the process proceeds to block 460 to increment j and returns to block 446. If, on the other hand, j is equal to $2^M$, the K values $\hat{x}_N$ yielding the smallest node metric $\Delta_{\hat{x}_N}$ are stored in the memory X. Then $\check{y}_{\hat{x}_N}$ and $\Delta_{\hat{x}_N}$ are respectively stored in the memories Y and D for the K values $\hat{x}_N$ yielding the smallest node metric $\Delta_{\hat{x}_N}$ (block 462). The process can then proceed to K-HOLD, block 434.

Figure 4C:
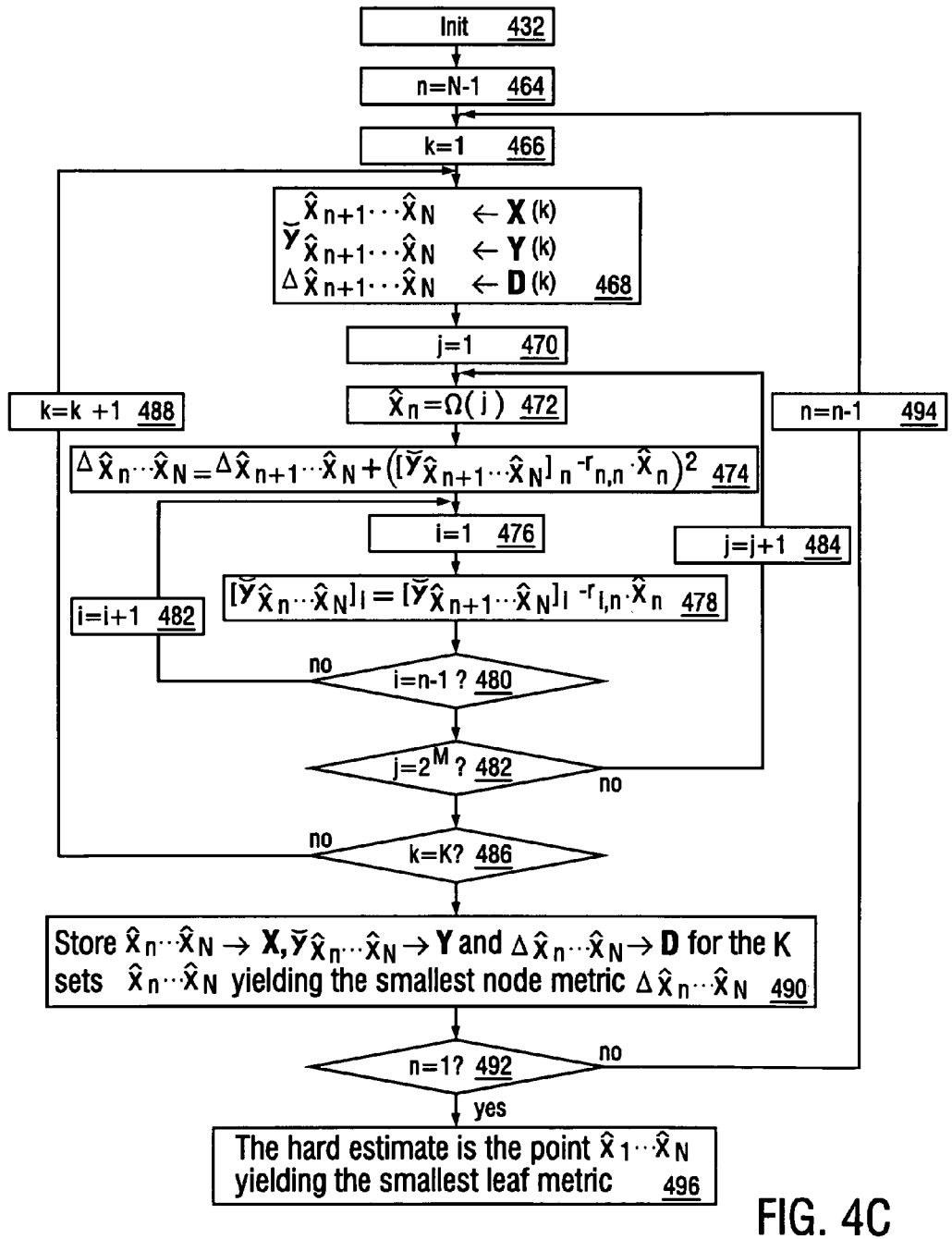
FIG. 4C illustrates an exemplary embodiment of a process that may be utilized for implementing the K-HOLD algorithm, as illustrated in FIG. 4A.

FIG. 4C illustrates an exemplary embodiment of a process that may be utilized for implementing the K-HOLD algorithm, as illustrated in FIG. 4A. More specifically, after initialization (block 432), the process can advance to the K-HOLD (block 434) portion of the process. At block 464 n is set to N−1. Then, the variable k is set to 1 (block 466). A node label $\hat{x}_{n+1} \ldots \hat{x}_N$ is read from the k-th position in the memory X; $\check{y}_{\hat{x}_{n+1} \ldots \hat{x}_N}$ is read from the k-th position in memory Y; and $\Delta_{\hat{x}_{n+1} \ldots \hat{x}_N}$ is read from the k-th position in memory D (block 468). Then, j may be assigned to a value of 1 (block 470). Similarly, $\hat{x}_n$ may be determined as $\Omega(j)$, that corresponds to the $j^{th}$ signal in the signal set (block 472). From this determination, $\Delta_{\hat{x}_n \ldots \hat{x}_N}$ can be determined as $\Delta_{\hat{x}_{n-1} \ldots \hat{x}_N} + ([\check{y}_{\hat{x}_{n+1} \ldots \hat{x}_N}]_n - r_{n,n} \cdot \hat{x}_n)^2$ (block 474).

At block 476, i may be assigned a value of 1. Additionally, $[\check{y}_{\hat{x}_n \ldots \hat{x}_N}]_i$ may be determined as $[\check{y}_{\hat{x}_{n+1} \ldots \hat{x}_N}]_i - r_{i,n} \cdot \hat{x}_n$ (block 478). A determination can then be made whether i is equal to n−1 (block 480). If not, i is incremented by 1 (block 482) and the process returns to block 478. If, on the other hand, i is equal to n−1, a determination is made whether j is equal to $2^M$ (block 482). If not, j is incremented by 1 (block 484) and the process returns to block 472. If, on the other hand j is equal to $2^M$, a determination is made whether k (lower case) is equal to K (upper case) (block 486). If not, k is incremented by 1 (block 488) and the process returns to block 462. If, however, k is equal to K, the assignments $\hat{x}_n \ldots \hat{x}_N$, $\Delta_{\hat{x}_n \ldots \hat{x}_N}$, and $\check{y}_{\hat{x}_n \ldots \hat{x}_N}$ can be stored for the K sets $\hat{x}_n \ldots \hat{x}_N$ yielding the smallest node metric $\Delta_{\hat{x}_n \ldots \hat{x}_N}$ (block 490). A determination can then be made whether n=1 (block 492). If not, n can be decremented by 1 (block 494) and the process can return to block 466. If, on the other hand, n does equal 1, a determination can be made that the hard estimate is the point $\hat{x}_1 \ldots \hat{x}_N$ that yields the smallest leaf metric (block 496).

Additionally, at least one modification to the algorithm of FIGS. 4A-4C may be implemented based on the intuition that the probability of not finding the most likely leaf can be reduced by first searching the dimensions of $\check{y}$ with the least noise and distortion. Thus, the decoding performance can be improved by modifying the order in which the dimensions are being searched in the tree. As a nonlimiting example, Hassibi's reordering algorithm has been shown to significantly improve K-best lattice decoding performance. Accordingly, reordering may be performed during the preprocessing stage of the algorithm, and hence does not noticeably affect the computational complexity.

Similarly, to limit the number of branch metrics computed per level, one can limit the total number $2^M$ of branches leaving each node to a smaller number $J < 2^M$. A good branch selection involves choosing the J branches most likely to lead to the most likely (ML) leaf, (typically, the J branches with the smallest metric). This may involve determining, for each node $\hat{x}_n \ldots \hat{x}_N$, a subset $\Omega_{\hat{x}_n \ldots \hat{x}_N}$ of $\Omega$ containing the J coordinates $\hat{x}_{n-1}$ that minimize the branch metric $\delta_{\hat{x}_{n-1} \ldots \hat{x}_N}$. Reducing the number of branches leaving a node involves replacing $\hat{x}_n = \Omega(j)$ with $\hat{x}_n = \Omega_{\hat{x}_n \ldots \hat{x}_N}(j)$ and replacing $j < 2^M$ with $j < J$ in the blocks 458 and 482 of the algorithm of FIGS. 4A-4C. One should note that these and other modifications may be implemented individually or together, depending on the particular embodiment.

Similarly, while some embodiments may be utilized as hard detection algorithms, at least one embodiment may be utilized as a soft detection algorithm. Embodiments of soft-detection algorithms may be configured to provide a bit-wise soft-reliability information approaching the log-likelihood ratio (LLR)

$$\Lambda_{m,n} = \log \frac{P_r(y|b_{m,n}=1)}{P_r(y|b_{m,n}=0)} \quad (18)$$

$$\forall \{m,n\} \in \{1, \ldots, M\} \times \{1, \ldots, N\}.$$

A (near-optimal) approximation of $\Lambda_{m,n}$ may be given by $$\Lambda_{m,n} \approx \frac{1}{2N_0} (\|y - H\hat{x}_{|b_{m,n}=0}\|^2 - \|y - H\hat{x}_{|b_{m,n}=1}\|^2), \quad (19)$$

where $$\hat{x}_{|b_{m,n}=z} = \underset{x \in \Omega^Z_{|b_{m,n}=z}}{\mathrm{argmin}} \|y - Hx\|^2 \quad (20)$$

$$\forall \{m,n\} \in \{1, \ldots, M\} \times \{1, \ldots, N\}, z \in \{0, 1\}.$$

In at least one embodiment, $\Omega^N_{|b_{m,n}=z}$ denotes the subset of $\Omega^N$ formed by signals representing the bit $b_{m,n}=z$.

A brute force technique to compute (19) may involve running a hard-output detection algorithm (such as, e.g., K-HOLD) a plurality of times to obtain $\hat{x}_{|b_{m,n}=z}$ for all combinations $\{m,n,z\} \in \{1, \ldots, M\} \times \{1, \ldots, N\} \times \{0,1\}$. Such brute force technique may be inefficient since it involves multiple tree searches per received signal. However, some embodiments describe K-best soft-output lattice decoding (K-SOLD), which can approach the performance of the brute force method with a significantly lower computational burden.

As opposed to the brute force technique, K-SOLD can approximate $\hat{x}_{|b_{m,n}=z}$ for all combinations $\{m,n,z\}$ in a single tree scan, which explains the significant complexity reduction. In at least one embodiment, K-SOLD can base a soft-output computation not only on the K·J leafs, but also on the pruned nodes visited while searching the tree. For each set $\{m,n\}$, a soft-output (19) may be computed by approximating square Euclidean distances $\|y-H\hat{x}_{|b_{m,n}=0}\|^2$ and $\|y-H\hat{x}_{|b_{m,n}=1}\|^2$ with a smallest metric associated with leafs and pruned nodes representing the bits $b_{m,n}=0$ and $b_{m,n}=1$, respectively. One should note that such approximation is equivalent to considering that the metrics of branches connecting a pruned node to a leaf are all-zero, which is obviously inexact for level-n≠1 nodes. Yet, simulations showed that such approximation does not significantly degrade performance, and can still lead to near-ML performance.

Additionally, K-SOLD may be similar to K-HOLD in that K-SOLD may utilize a similar algorithm to search the tree and compute the branch and node metrics. In at least one exemplary embodiment, one difference relative to K-HOLD is the utilization of extra resources for computing the soft-output. The calculation of the soft-output $\Lambda_{m,n}$ expressed in equation (19) can be performed independently for each bit $b_{m,n}$. For each set $\{m,n\}$, $\Lambda_{m,n}$ can be obtained by updating (for each visited node) two soft-bit metrics $L_{m,n}^0$ and $L_{m,n}^1$, where $L_{m,n}^z$ corresponds to the smallest computed node metric associated with nodes representing the bit $b_{m,n}=z$. For a visited node with label $\hat{x}_n \ldots \hat{x}_N$, the update of $L_{m,n}^z$ can be written $$L_{m,n}^0 = \Delta_{\hat{x}_n \ldots \hat{x}_N} \text{ if } \Delta_{\hat{x}_n \ldots \hat{x}_N} < L_{m,n}^0 \text{ and } b_{m,n}=0, \text{ and/or}$$

$$L_{m,n}^1 = \Delta_{\hat{x}_n \ldots \hat{x}_N} \text{ if } \Delta_{\hat{x}_n \ldots \hat{x}_N} < L_{m,n}^1 \text{ and } b_{m,n}=1 \quad (21)$$

where $b_{m,n}$ denotes the $m^{th}$ component bit mapped to $\hat{x}_n$. Once the entire tree has been scanned, the soft-output can be obtained by computing:

$$\Lambda_{m,n} = \frac{1}{2N_0} (L_{m,n}^0 - L_{m,n}^1) \quad (22)$$

$$\forall \{m,n\} \in \{1, \ldots, M\} \times \{1, \ldots, N\}.$$

As stated above, the computation of $L_{m,n}^z$ may be performed recursively while visiting the tree by updating $L_{m,n}^z$ with the metric of any node representing the bit $b_{m,n}=z$, if the latter metric is smaller than $L_{m,n}^z$. Then, before starting the tree search, $L_{m,n}^z$ may be initialized with a value $L_{init}$ that is greater than the metric $\Delta_{|b_{m,n}=z}^{1st}$ of the first visited node representing $b_{m,n}=z$, in order to ensure that $L_{m,n}^z$ will be updated with $\Delta_{|b_{m,n}=z}^{1st}$. A possible choice is $L_{init}=+\infty$.

Assuming the metrics of branches connecting a pruned node to a leaf are all-zero amounts to under-estimating the real leaf metric. Such under-estimation may become significant for nodes at higher levels, which can drastically degrade performance. A solution to reduce this degradation is to limit the node metrics used in the soft-output computation to the nodes at levels n≤N', where N'<N. The more N' approaches 1, the less impact the under-estimation has. Limiting nodes used for soft-output computation also lowers complexity, since the update in equation (21) is performed for fewer nodes.

The K-best search does not guarantee that all visited nodes for levels n<N can represent $b_{m,n}=z$ for all combinations $\{m,n,z\} \in \{1, \ldots, M\} \times \{1, \ldots, N\} \times \{0,1\}$. Therefore, by limiting the nodes used for soft-output computation to levels n≤N', there may exist sets $\{m,n,z\}$ for which $L_{m,n}^z$ is never updated, and hence remains equal to $L_{init}$. In such case, choosing $L_{init}$ too large may lead to performance degradation.

Similarly, $L_{m,n}^z$ may be initialized with a more moderate value $L_{init}=R<<+\infty$ and can be interpreted as a saturation threshold, which represents the fact that there may be no symbol representing the bit $b_{m,n}=z$ in a spherical region of radius R centered on ў. An optimized value of R yielding improved performance shall be jointly optimized with N' for each particular MIMO system, (i.e., for each particular signal set $\Omega^N$).

Figure 5A:
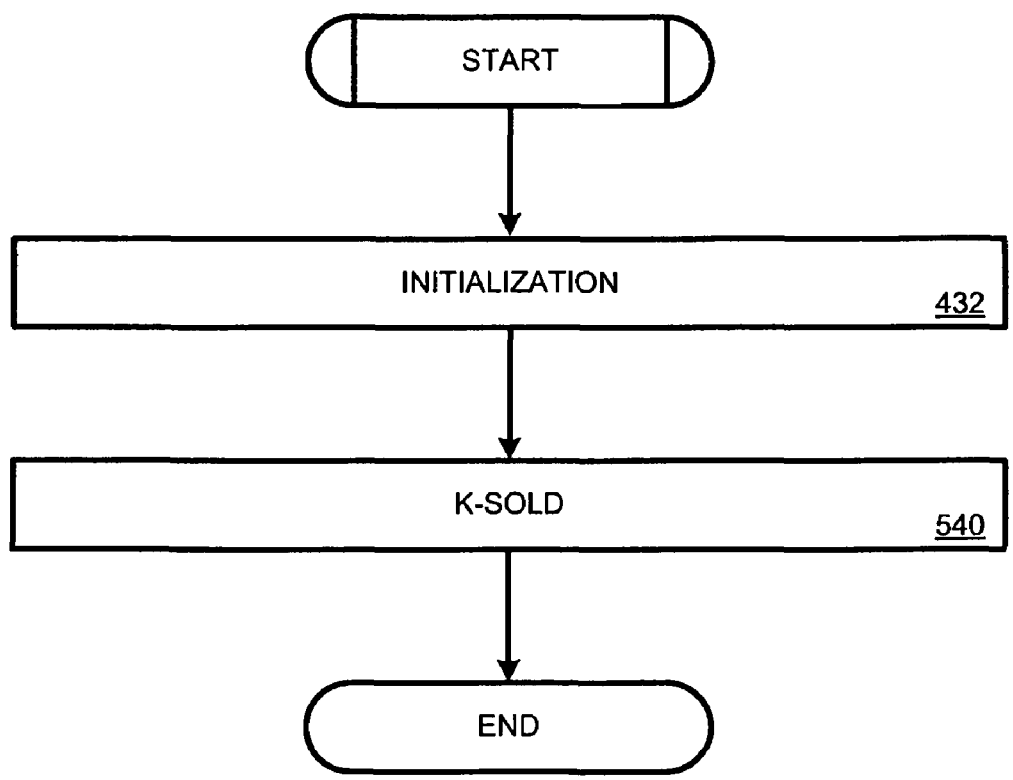
FIG. 5A illustrates a high level view of implementation of the K-SOLD algorithm, similar to the diagram from FIG. 4A.
Figure 5B:
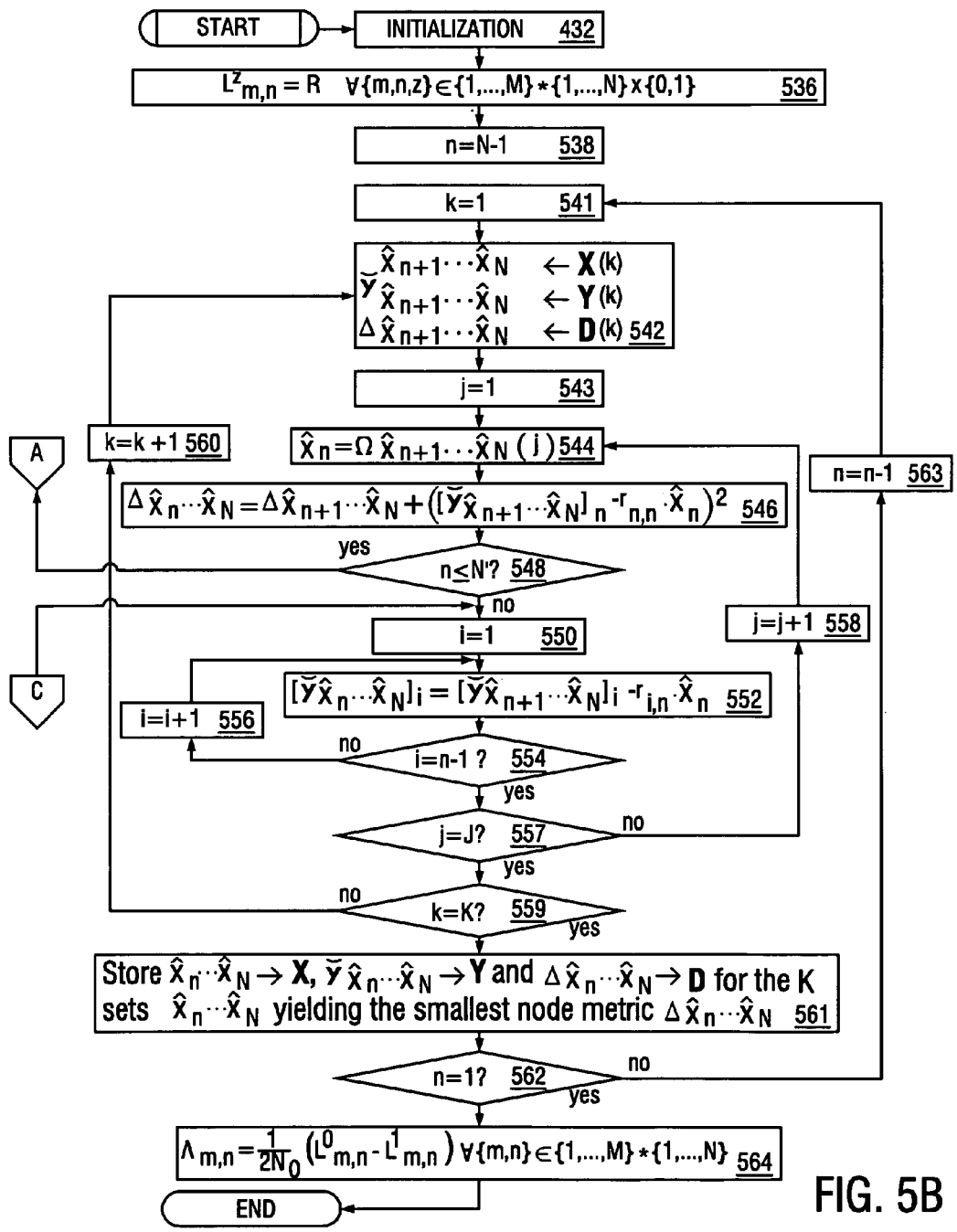
FIG. 5B illustrates an exemplary embodiment of a first portion of the K-SOLD algorithm of the process from FIG. 5A.
Figure 5C:
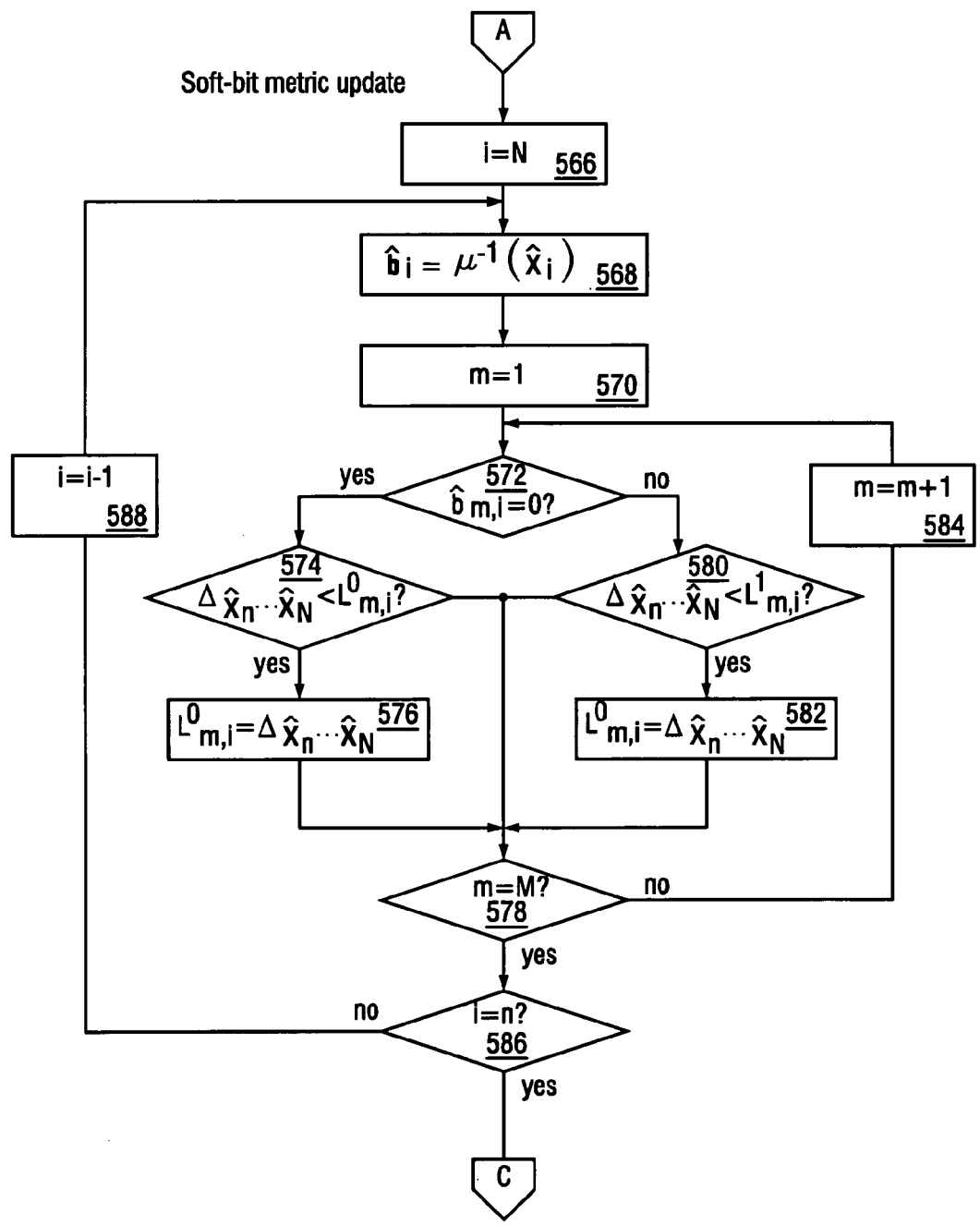
FIG. 5C illustrates an exemplary embodiment of a second portion of the K-SOLD algorithm, similar to the diagram from FIG. 5B.

Referring again to the drawings, FIGS. 5A-5C depict an embodiment of the K-SOLD algorithm. One should note X, Y, and D may be utilized as memories storing the K-best values of $\hat{x}_{n+1} \ldots \hat{x}_N$, $\check{y}_{\hat{x}_{n+1} \ldots \hat{x}_N}$ and $\Delta_{\hat{x}_{n+1} \ldots \hat{x}_N}$, respectively. The memory size for X, Y, and D for level-n may equal (N-n+1)× K, (n−1)×K and 1×K, respectively.

More specifically, FIG. 5A illustrates a high level view of implementation of the K-SOLD algorithm, similar to the diagram from FIG. 4A. More specifically, an initialization portion (block 432) of the K-HOLD algorithm may be utilized. The K-SOLD portion of the algorithm may be implemented (block 540).

FIG. 5B illustrates an exemplary embodiment of a first portion of the K-SOLD algorithm (block 540) for the process from FIG. 5A. As illustrated in FIG. 5B, an initialization algorithm (block 432) may be implemented, such as the initialization algorithm from FIG. 4B. Additionally, as indicated above, $L_{m,n}^z$ can then be initialized to R for all combinations $\{m,n,z\} \in \{1, \ldots, M\} \times \{1, \ldots, N\} \times \{0,1\}$ (block 536). An embodiment of the K-HOLD algorithm may additionally be implemented, similar to the K-HOLD algorithm from FIG. 4. More specifically, n may be set to N−1 (block 538). Similarly, k may be set to 1 (block 541). Additionally, a node level $\hat{x}_{n+1} \ldots \hat{x}_N$ is read from the k-th position in the memory X; $\check{y}_{\hat{x}_{n+1} \ldots \hat{x}_N}$ is read from the k-th position in memory Y; and $\Delta_{\hat{x}_{n+1} \ldots \hat{x}_N}$ is read from the k-th position in memory D (block 542). Further, j may be assigned a value of 1 (block 543). $\hat{x}_n$ may be set to the $j^{th}$ value $\Omega_{\hat{x}_{n+1}...\hat{x}_N}(j)$ of the subset $\Omega_{\hat{x}_{n+1}...\hat{x}_N}$ (block 544). $\Delta_{\hat{x}_n...\hat{x}_N}$ may be calculated from $\Delta_{\hat{x}_{n+1}...\hat{x}_N}$+ $([\check{y}_{\hat{x}_{n+1}...\hat{x}_N}]_n - r_{m,n}\hat{x}_n)^2$ (block 546). A determination can then be made whether n is less than or equal N' (block 546). If n is less than or equal to N', the process can proceed to jump block A, continued in FIG. 5C. If n is not less than or equal to N', the variable i can be set to 1 (block 550). Additionally, $[\check{y}_{\hat{x}_n...\hat{x}_N}]_i$ can be calculated from $[\check{y}_{\hat{x}_{n+1}...\hat{x}_N}]_i - r_{i,n}\hat{x}_n$ (block 552). A determination can then be made whether i is equal than n−1 (block 554). If not, i is incremented by 1 (block 556) and the process returns to block 552. If, however, i is equal to n−1, a determination is made whether j is equal to J (block 557). If not, the variable j may be incremented by 1 and the process can return to block 544. If, however, j is equal to J, a determination is made whether k is equal to K (block 559). If k is not equal to K, k can be incremented by 1 and the process can return to block 542. If, however, k does equal K, the assignments $\hat{x}_n...\hat{x}_N$, $\check{y}_{\hat{x}_n...\hat{x}_N}$, and $\Delta_{\hat{x}_n...\hat{x}_N}$ can be stored for the K sets $\hat{x}_n...\hat{x}_N$ that yield the smallest node metric $\Delta_{\hat{x}_n...\hat{x}_N}$ (block 561). A determination can then be made whether n is equal to 1 (block 562). If not, the variable n can be decremented by 1 and the process can proceed to block 541. If, however, n is equal to 1, $\Lambda_{m,n}$ can be calculated from $$\frac{1}{2N_0}(L^0_{m,n} - L^1_{m,n})$$

for all sets $\{m,n\} \in \{1,\ldots,M\} \times \{1,\ldots,N\}$ (block 564).

FIG. 5C depicts an exemplary embodiment of a process that may be utilized for implementing an embodiment of the K-SOLD algorithm (540), such as illustrated in FIG. 5B. More specifically, from jump block A in FIG. 5B, the variable i may be set to the value of N (block 566). Additionally, the bit vector $\hat{b}_i$ may be calculated from $\mu^{-1}(\hat{x}_i)$, which involves demapping the signal $\hat{x}_i$ (block 568). The variable m may then be set to 1 (block 570). A determination can then be made whether the bit $\hat{b}_{m,i}$ is equal to zero (block 572). If $\hat{b}_{m,i}$ equals zero, a determination can be made whether $\Delta_{\hat{x}_n...\hat{x}_N}$ is less than $L_{m,i}^0$ (block 574). If so, $L_{m,i}^0$ is set to $\Delta_{\hat{x}_n...\hat{x}_N}$ (block 576). If, at block 574 $\Delta_{\hat{x}_n...\hat{x}_N}$ is not less than $L_{m,i}^0$, the process proceeds to block 578. Similarly, if at block 572 $\hat{b}_{m,i}$ does not equal zero, the process proceeds to block 580. From block 580 if $\Delta_{\hat{x}_n...\hat{x}_N}$ is less than $L_{m,i}^1$, $L_{m,i}^1$ is set to $\Delta\hat{x}_{n...\hat{x}_N}$ (block 582). A determination can be made at block 578 whether m is equal to M. If not, m is incremented by 1 and the process returns to block 572. If, on the other hand, m does equal M, a determination can be made whether i equals n (block 586). If not, i is decremented by 1 and the process returns to block 568. If, however, i is equal to n, the process proceeds to jump block C, continued in FIG. 5B.

FIG. 6A depicts an exemplary graphical representation of K-HOLD detection performance for unitary average energy uncoded 16-QAM transmission over a 2×2 uncorrelated Rayleigh fading (URF) channel with background AWGN. More specifically, as illustrated in the nonlimiting example of FIG. 6A, K-HOLD performance may be implemented with K=8 and J=$2^M$ and uncoded 16-QAM transmission over a 2×2 uncorrelated Rayleigh fading channel with background AWGN. In the nonlimiting example of FIG. 6A, K-HOLD is being compared with other detection methods such as hard-output optimal (ML) detection (exhaustive search) and MMSE equalization. Simulations assume a perfect knowledge of H and $N_0$. K-HOLD performs similarly to existing K-best MIMO detectors, since it searches the tree in an identical K-best manner.

Because many MIMO systems utilize soft-input channel decoding, the following is based on K-SOLD performance. At least one nonlimiting example utilizes K-SOLD detection performance for unitary average energy convolutional coded 16-QAM and 64-QAM transmissions over 2×2 and 4×4 uncorrelated Rayleigh fading channels with background AWGN. The considered convolutional code is the 64-state non-recursive convolutional code recommended in the IEEE standards 802.11n and 802.16e. In at least one exemplary embodiment, simulations may assume perfect knowledge of H and $N_0$. It may also be assumed that no channel matrix reordering is performed prior to the decoding stage (unless stated otherwise).

Additionally, the complexity of the K-best search is proportional to the total number of visited nodes per level in the tree. The complexity can then be lowered by reducing J and/or K. Some embodiments may implement J=min $\{2^M,4\}$. Simulation results for hard and soft output detection showed that using J=min$\{2^M,4\}$ yields no noticeable performance degradation as compared to using J=$2^M$.

The effect of K is illustrated in FIG. 6B for optimized 2×2 coded 16-QAM transmission. More specifically, FIG. 6B illustrates K-SOLD performance as a function of K for 64-state convolutional coded 16-QAM transmission over 2×2 URF channel with background AWGN. As illustrated, detection performance approaches the ML bound as K increases, and vice-versa. Nevertheless, unlike for J, no specific value for K is recommended. The choice of K may rather be driven by the available computational resources (i.e., available number of operations per second) and the data throughput. As a nonlimiting example, values of K between 5 and 16 may provide good performance/complexity tradeoffs.

Additionally, other parameters, such as N' and R can degrade K-SOLD performance if not aptly chosen. As a nonlimiting example, FIG. 6C depicts an exemplary graphical representation, showing the impact of the choice of {N',R} on the 8-SOLD performance for a 4×4 coded 16-QAM MIMO system. More specifically, as illustrated in FIG. 6C, K-SOLD performance may be represented as a function of N' and R for 64-state convolutional coded 16-QAM transmission over 4×4 URF channel with background AWGN. The couple {N',R} may be referred to as N'/R. Increased performance degradation may result for larger N'. However, depending on the particular nonlimiting embodiment, choosing N'=1 may not always lead to the best performance (especially when reordering the channel matrix). Conversely, reducing N' increases the probability to saturate the soft-bit metric, and hence increases the impact of the choice of the saturation threshold R.

Additionally, Table 1 lists the couples {N',R} yielding the best detection performance for 802.16e (2×2 QAM) and 802.11n (4×4 QAM) systems transmitting over an uncorrelated Rayleigh fading channel. Performance has been evaluated via Monte-Carlo simulations, for all $\{N',R\} \in \{1,2,\ldots,N\} \times \{0.05, 0.1,\ldots, 4.95, 5\}$.

TABLE 1

Optimized Values of N' and R for Wi-Fi and WiMAX Systems. URF environment. BER of $10^{-5}$.

|  | 2 × 2 QPSK | 2 × 2 16-QAM | 2 × 2 64-QAM | 4 × 4 QPSK | 4 × 4 16-QAM | 4 × 4 64-QAM |
|---|---|---|---|---|---|---|
| N' | 1 | 1 | 3 | 1 | 1 | 1 |
| R | 5.0 | 0.75 | 0.15 | 4.0 | 0.65 | 0.1 |

Performance results discussed so far assume no reordering the channel matrix. Nonetheless, for a BER of $10^{-5}$ and K=8, when reordering H, little performance improvement may be seen for QPSK transmission, and around 0.2 to 0.3 dB performance improvement for 16 and 64-QAM transmission, as illustrated in FIG. 6D. Therefore, unlike for K-best hard-output detection (including K-HOLD), reordering the channel matrix has a rather marginal impact on K-SOLD performance. More specifically, FIG. 6D illustrates an effect of matrix reordering on K-SOLD performance for 64-state convolutional coded 16 and 64-QAM transmission over 4×4 URF channel with background AWGN.

Included herein are embodiments of a novel approach for computing metrics in K-best MIMO detection algorithms. By identifying the detection process to a K-best tree search, these embodiments involve updating node metrics such that the complexity associated with each node decreases with its depth in the tree, thereby better balancing the node update complexity and the number of visited nodes at a given depth. Embodiments disclosed herein also include a plurality of new K-best lattice decoding algorithms. A first algorithm, referred as K-HOLD, may be configured to generate a hard-output on the received signal for a complexity reduction as compared to existing K-best hard detectors with similar performance. A second algorithm, referred as K-SOLD, is a low-complexity soft-output extension of K-HOLD.

Embodiments of these algorithms include: branch and node metric computation technique such that the complexity associated with each node decreases with the node depth in the tree. Similarly, embodiments of K-SOLD may be configured such that not only leaf metrics are used in the computation of the soft-output, but also the pruned node metrics. In other words, N' can be >1. Additionally included is one or more techniques to saturate the soft-bit metric, including the choice of R. The optimization of the parameters N' and R is also provided in Table 1 for some particular exemplary MIMO systems.

Further, both K-HOLD and K-SOLD algorithms may be configured to achieve ML or near-ML performance with a significant complexity reduction as compared to brute force ML detection methods. Simulation results for various QAM transmissions over a 2×2 uncorrelated Rayleigh fading channel illustrate the near-optimality of our algorithm as compared to optimal (ML) performance. Besides, simulations showed that, for Wi-Fi and WiMAX applications, K-SOLD can approach ML performance within 1 dB for very reasonable complexity (K=8). One should also note that the embodiments for metric computation detailed in herein can be easily applied to any tree search based decoding technique, which includes, as a nonlimiting example, sphere decoding.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:
1. A method for computing metrics, comprising:
   searching a MIMO detection tree, the detection tree configuration being formed by a plurality of nodes and a plurality of leaves connected via a plurality of branches, the searching including updating node metrics such that computational complexity associated with each node decreases with the node depth in the tree configuration; and
   providing an estimate on a transmitted signal.

2. The method of claim 1, wherein the tree configuration is searched in a K-best manner, and wherein providing the estimate includes providing a hard estimate on the transmitted signal, the hard estimate indicating a signal associated with the leaf with the smallest metric in the tree configuration.

3. The method of claim 1, wherein the tree configuration is searched in a K-best manner, and wherein providing the estimate includes providing a soft estimate on the transmitted signal, the soft estimate indicating one or more bitwise soft-reliability information on the bits mapped to the transmitted signal, the bitwise soft-reliability information including a scaled difference of soft-bit metrics, the soft-bit metric indicating a computed node metric.

4. The method of claim 3, wherein computation of a soft estimate is based on:
one or more leaf metrics; and
one or more metrics associated with nodes pruned at levels with an index smaller than a level threshold (N'), where N' is smaller or equal to the total number N of levels in the tree configuration.

5. The method of claim 3, further comprising saturating the at least one soft-bit metric to a saturation threshold R, wherein saturating the at least one soft-bit metric includes determining a value R of the saturation threshold.

6. The method of claim 4, further comprising optimizing the level threshold (N') under which the pruned nodes are utilized in the computation of the soft-output, wherein optimizing includes at least one of the following:
determining N'=1 for a 2×2 MIMO system utilizing Quadrature phase shift keying (QPSK) modulation;
determining N'=1 for a 2×2 MIMO system utilizing 16-signal quadrature amplitude modulation (QAM);
determining N'=3 for a 2×2 MIMO system utilizing 64-signal quadrature amplitude modulation;
determining N'=1 for a 4×4 MIMO system utilizing Quadrature phase shift keying modulation;
determining N'=1 for a 4×4 MIMO system utilizing 16-signal quadrature amplitude modulation; and
determining N'=1 for a 4×4 MIMO system utilizing 64-signal quadrature amplitude modulation.

7. The method of claim 5, further comprising optimizing a value of the saturation threshold (R), wherein optimizing includes at least one of the following:
determining R=5.0 for a 2×2 MIMO system utilizing Quadrature phase shift keying (QPSK) modulation;
determining R=0.75 for a 2×2 MIMO system utilizing 16-signal quadrature amplitude modulation (QAM);
determining R=0.15 for a 2×2 MIMO system utilizing 64-signal quadrature amplitude modulation;
determining R=4.0 for a 4×4 MIMO system utilizing Quadrature phase shift keying modulation;
determining R=0.65 for a 4×4 MIMO system utilizing 16-signal quadrature amplitude modulation; and
determining R=0.1 for a 4×4 MIMO system utilizing 64-signal quadrature amplitude modulation.

8. A system for computing metrics, comprising:
a searching component configured to search a MIMO detection tree, the detection tree configuration being formed by a plurality of nodes and a plurality of leaves connected via a plurality of branches, the searching component including a node metrics updating component configured such that computational complexity associated with each node decreases with the node depth in the tree configuration; and
a providing component configured to provide an estimate on a transmitted signal.

9. The system of claim 8, wherein the tree configuration is searched in a K-best manner, and wherein providing the estimate includes providing a hard estimate on the transmitted signal, the hard estimate indicating a signal associated with the leaf with the smallest metric in the tree configuration.

10. The system of claim 8, wherein the tree configuration is searched in a K-best manner, and wherein providing the estimate includes providing a soft estimate on the transmitted signal, the soft estimate indicating one or more bitwise soft-reliability information on the bits mapped to the transmitted signal, the bitwise soft-reliability information including a scaled difference of soft-bit metrics, the soft-bit metric indicating a computed node metric.

11. The system of claim 10, wherein computation of a soft estimate is based on:
one or more leaf metrics; and
one or more metrics associated with nodes pruned at levels with an index smaller than a level threshold (N'), where N' is smaller or equal to the total number N of levels in the tree configuration.

12. The system of claim 10, further comprising a saturating component configured to saturate the at least one soft-bit metric to a saturation threshold R, wherein saturating the at least one soft-bit metric includes determining a value R of the saturation threshold.

13. The system of claim 11, further comprising an optimizing component configured to optimize the level threshold (N') under which the pruned nodes are utilized in the computation of the soft-output, wherein optimizing includes at least one of the following:
determining N'=1 for a 2×2 MIMO system utilizing Quadrature phase shift keying (QPSK) modulation;
determining N'=1 for a 2×2 MIMO system utilizing 16-signal quadrature amplitude modulation (QAM);
determining N'=3 for a 2×2 MIMO system utilizing 64-signal quadrature amplitude modulation;
determining N'=1 for a 4×4 MIMO system utilizing Quadrature phase shift keying modulation;
determining N'=1 for a 4×4 MIMO system utilizing 16-signal quadrature amplitude modulation; and
determining N'=1 for a 4×4 MIMO system utilizing 64-signal quadrature amplitude modulation.

14. The system of claim 12, further comprising an optimizing component configured to optimize a value of the saturation threshold (R), wherein optimizing includes at least one of the following:
determining R=5.0 for a 2×2 MIMO system utilizing Quadrature phase shift keying (QPSK) modulation;
determining R=0.75 for a 2×2 MIMO system utilizing 16-signal quadrature amplitude modulation (QAM);
determining R=0.15 for a 2×2 MIMO system utilizing 64-signal quadrature amplitude modulation;
determining R=4.0 for a 4×4 MIMO system utilizing Quadrature phase shift keying modulation;
determining R=0.65 for a 4×4 MIMO system utilizing 16-signal quadrature amplitude modulation; and
determining R=0.1 for a 4×4 MIMO system utilizing 64-signal quadrature amplitude modulation.

15. A system for computing metrics, comprising:
means for searching a MIMO detection tree, the detection tree configuration being formed by a plurality of nodes and a plurality of leaves connected via a plurality of branches, the means for searching including means for updating node metrics such that computational complexity associated with each node decreases with the node depth in the tree configuration; and
means for providing an estimate on a transmitted signal.

16. The system of claim 15, wherein the tree configuration is searched in a K-best manner, and wherein providing the estimate includes providing a hard estimate on the transmitted signal, the hard estimate indicating a signal associated with the leaf with the smallest metric in the tree configuration.

17. The system of claim 15, wherein the tree configuration is searched in a K-best manner, and wherein providing the estimate includes providing a soft estimate on the transmitted signal, the soft estimate indicating one or more bitwise soft-reliability information on the bits mapped to the transmitted signal, the bitwise soft-reliability information including a scaled difference of soft-bit metrics, the soft-bit metric indicating a computed node metric.

18. The system of claim 17, wherein computation of a soft estimate is based on:
one or more leaf metrics; and
one or more metrics associated with nodes pruned at levels with an index smaller than a level threshold (N'), where N' is smaller or equal to the total number N of levels in the tree configuration.

19. The system of claim 17, further comprising means for saturating the at least one soft-bit metric to a saturation threshold R, wherein saturating the at least one soft-bit metric includes determining a value R of the saturation threshold.

20. The system of claim 19, further comprising means for optimizing a value of the saturation threshold (R), wherein optimizing includes at least one of the following:
determining R=5.0 for a 2×2 MIMO system utilizing Quadrature phase shift keying (QPSK) modulation;
determining R=0.75 for a 2×2 MIMO system utilizing 16-signal quadrature amplitude modulation (QAM);
determining R=0.15 for a 2×2 MIMO system utilizing 64-signal quadrature amplitude modulation;
determining R=4.0 for a 4×4 MIMO system utilizing Quadrature phase shift keying modulation;
determining R=0.65 for a 4×4 MIMO system utilizing 16-signal quadrature amplitude modulation; and
determining R=0.1 for a 4×4 MIMO system utilizing 64-signal quadrature amplitude modulation.

* * * * *

UNITED STATES PATENT AND TRADEMARK OFFICE
CERTIFICATE OF CORRECTION

PATENT NO. : 8,391,378 B2
APPLICATION NO. : 12/251862
DATED : March 5, 2013
INVENTOR(S) : Duvaut et al.

It is certified that error appears in the above-identified patent and that said Letters Patent is hereby corrected as shown below:

On the Title Page, in Item (75), under "Inventors", in Column 1, Line 2, delete "D" and insert -- D. --, therefor.

In the Specifications

In Column 4, Line 30, delete "$\|\breve{y}-R\hat{X}\|^2$" and insert -- $\|\breve{y} - R\hat{x}\|^2$ --, therefor.

In Column 4, Line 46, delete "$[\hat{x}_n \cdots \hat{x}_N]$" and insert -- $[\hat{x}_n \cdots \hat{x}_N]^T$ --, therefor.

In Column 5, Line 10, delete "$\Delta_{\hat{x}_1} \cdots \hat{x}_N$" and insert -- $\Delta_{\hat{x}_1 \cdots \hat{x}_N}$ --, therefor.

In Column 5, Line 20, delete "$2^{M(N-n-1)}$" and insert -- $2^{M(N-n+1)}$ --, therefor.

In Column 5, Line 31, delete "$\Delta_{\hat{x}_{n-1}} \cdots \hat{x}_N$" and insert -- $\Delta_{\hat{x}_{n+1} \cdots \hat{x}_N}$ --, therefor.

In Column 5, Line 40, delete "$\delta\hat{x}_n \cdots \hat{x}_N$" and insert -- $\delta_{\hat{x}_n \cdots \hat{x}_N}$ --, therefor.

In Column 6, Line 34, in Equation (13), delete "$\delta_{\hat{x}_N} =$" and insert -- $\delta_{\hat{x}_N} =$ --, therefor.

In Column 6, Line 38, delete "$\delta\hat{x}_N,$" and insert -- $\delta_{\hat{x}_N},$ --, therefor.

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,391,378 B2

In the Specifications

In Column 6, Line 41, in Equation (14), delete "$([\check{y}_{\hat{x}_N}]_{N-1} r_{N-1,N-1} \cdot \hat{x}_{N-1})^2$," and insert -- $([\tilde{y}_{\hat{x}_N}]_{N-1} - r_{N-1,N-1} \cdot \hat{x}_{N-1})^2$ --, therefor.

In Column 6, Line 42, delete "$\check{y}_{\hat{x}_N}$," and insert -- $\tilde{y}_{\hat{x}_N}$ --, therefor.

In Column 7, Line 13, delete "$\check{y}_{\hat{x}_n \ldots \hat{x}_N}$," and insert -- $\tilde{y}_{\hat{x}_n \cdots \hat{x}_N}$ --, therefor.

In Column 8, Line 12, delete "$\Delta_{\hat{x}_{n+1} \ldots \hat{x}_N}$," and insert -- $\Delta_{\hat{x}_{n+1} \cdots \hat{x}_N}$ --, therefor.

In Column 8, Line 29, delete "$\Delta_{\hat{x}_n \ldots \hat{x}_N}$," and insert -- $\Delta_{\hat{x}_n \cdots \hat{x}_N}$ --, therefor.

In Column 9, Line 17, in Equation (20), delete "$\underset{x \in \Omega_{|b_{m,n}=z}^{Z}}{\operatorname{argmin}} \|y - Hx\|^2$" and insert -- $\underset{\mathbf{x} \in \Omega_{|b_{m,n}=z}^{N}}{\arg\min} \|\mathbf{y} - \mathbf{H}\mathbf{x}\|^2$ --, therefor.

In Column 9, Line 22, delete "$\Omega_{|b_{m,n}=z}^{N}$" and insert -- $\Omega_{|b_{m,n}=z}^{N}$ --, therefor.

In Column 11, Line 45, delete "$\Delta \hat{x}_n \ldots \hat{x}_N$" and insert -- $\Delta \hat{x}_n \cdots \hat{x}_N$ --, therefor.

In Column 14, Line 37, delete ""scan,"" and insert -- "can," --, therefor.